US012312964B2

(12) United States Patent
Targett et al.

(10) Patent No.: US 12,312,964 B2
(45) Date of Patent: May 27, 2025

(54) CONTEXT-RESPONSIVE SYSTEMS AND METHODS FOR OPERATING A CARBON REMOVAL FACILITY

(71) Applicant: Myno Carbon Corp., Bainbridge Island, WA (US)

(72) Inventors: Matthew Targett, Bainbridge Island, WA (US); Myles Gray, Portland, OR (US); Mike Miller, Anchorage, AK (US)

(73) Assignee: Myno Carbon Corp.

( * ) Notice: Subject to any disclaimer, the term of this patent is extended or adjusted under 35 U.S.C. 154(b) by 0 days.

(21) Appl. No.: 18/781,775

(22) Filed: Jul. 23, 2024

(65) Prior Publication Data

US 2024/0401496 A1 Dec. 5, 2024

Related U.S. Application Data

(63) Continuation-in-part of application No. PCT/US2023/076964, filed on Oct. 16, 2023.
(Continued)

(51) Int. Cl.
*F01D 15/10* (2006.01)
*C01F 11/06* (2006.01)
(Continued)

(52) U.S. Cl.
CPC .............. *F01D 15/10* (2013.01); *C01F 11/06* (2013.01); *C10B 53/02* (2013.01); *G05B 13/028* (2013.01); *F05D 2220/76* (2013.01)

(58) Field of Classification Search
CPC ........ B01D 2251/404; B01D 2257/504; B01D 53/62; B01J 6/001; B01J 6/008;
(Continued)

(56) References Cited

U.S. PATENT DOCUMENTS 7,306,086 B2   12/2007   Boelaars
8,425,633 B2   4/2013   Banasiak et al.
(Continued)

OTHER PUBLICATIONS

International Search Report and Written Opinion for PCT/US2023/076964 mailed on Mar. 26, 2024, 18 pages.
(Continued)

*Primary Examiner* — Ellen M McAvoy
*Assistant Examiner* — Chantel Graham
(74) *Attorney, Agent, or Firm* — AEON Law, PLLC; Adam L. K. Philipp; Jonathan E. Olson (57) ABSTRACT

Some protocols herein implement a first separation between first and second hybrid biochar production runs as a selective and conditional response to a sensor-based event whereby the first hybrid biochar production run is protected from a risk pertaining to the second hybrid biochar production run. Some variants implement synergies featuring biochar pyrolysis in close proximity to calcination or that otherwise facilitate durable "green cement." Some variants implement a production line that can switch between a first operating protocol calibrated to yield more power and a second operating protocol calibrated to reduce a biochar-blend-type inventory shortage. And in some variants steam from one or more heaters powers a first turbine and a first condenser downstream is positioned adjacent an oxygen-depleted vessel so that some of the thermal energy recaptured during condensation is applied to produce biochar.

20 Claims, 7 Drawing Sheets

Related U.S. Application Data (60) Provisional application No. 63/379,568, filed on Oct. 14, 2022.

(51) Int. Cl.
*C10B 53/02* (2006.01)
*G05B 13/02* (2006.01)

(58) Field of Classification Search
CPC ......... C01B 32/50; C01B 32/60; C01F 11/06; C10B 53/02; F01D 15/10; F05D 2220/76; G05B 13/028; G06N 20/20
See application file for complete search history.

(56) References Cited

U.S. PATENT DOCUMENTS

| | | | |
|---|---|---|---|
| 8,690,975 B2 | 4/2014 | Tsangaris et al. | |
| 8,772,559 B2 | 7/2014 | Smaidris | |
| 9,205,375 B2 | 12/2015 | Jones et al. | |
| 9,669,574 B2 | 6/2017 | Morales-Alvarez et al. | |
| 10,005,064 B2 | 6/2018 | Grünewald et al. | |
| 10,065,801 B2 | 9/2018 | Miller et al. | |
| 11,001,776 B2 | 5/2021 | Hoffman et al. | |
| 2008/0031801 A1 | 2/2008 | Lackner et al. | |
| 2009/0162268 A1* | 6/2009 | Hufton | B01D 53/0462 423/656 |
| 2010/0108567 A1* | 5/2010 | Medoff | C10G 3/00 208/113 |
| 2010/0120128 A1 | 5/2010 | Liang | |
| 2011/0035998 A1* | 2/2011 | Badger | C10B 49/16 44/639 |
| 2014/0102343 A1* | 4/2014 | Stallmann | B01D 53/75 110/216 |
| 2017/0066696 A1 | 3/2017 | Appel et al. | |
| 2017/0259507 A1 | 9/2017 | Hocker | |
| 2017/0313499 A1 | 11/2017 | Hughes et al. | |
| 2018/0305621 A1 | 10/2018 | Weaver et al. | |
| 2021/0261877 A1 | 8/2021 | Despen et al. | |

OTHER PUBLICATIONS

Woolf et al., "Greenhouse Gas Inventory Model for Biochar Additions to Soil", Environ. Sci. Technol., vol. 55, Year 2021, pp. 14795-14805.

* cited by examiner

CONTEXT-RESPONSIVE SYSTEMS AND METHODS FOR OPERATING A CARBON REMOVAL FACILITY

RELATED APPLICATIONS

This application is a bypass continuation-in-part of International Application Number PCT/US2023/076964, filed 16 Oct. 2023 (entitled "Context-Responsive Systems and Methods for Operating a Carbon Removal Facility") and claims benefit to U.S. Provisional Application Ser. No. 63/379,568 filed on 14 Oct. 2022 (also entitled "Context-Responsive Systems and Methods for Operating a Carbon Removal Facility"). Both are incorporated by reference as though their entire text were included herein.

BACKGROUND

The tactical use of oxygen-depleted environments and materials generated within them is of particular importance to mitigating greenhouse gas (GHG) emissions on an industrial scale. The term "oxygen-depleted" herein refers to a material processing environment having a gas mixture that is less than 20% free oxygen by mass, and often less than 5%. Pyrolysis technology is emerging for stabilizing carbon in biomass as a durable carbon dioxide removal solution, for example, via coordinated industrial production of both renewable energy and biochar. Such technology has its challenges, however, in terms of tracking and acting upon variable feedstock composition, synergistic material and energy flow, local contexts of each installation, and efficient information management for sustainable mitigations that are worthy of community support.

DETAILED DESCRIPTION

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Alternative," "application-specific," "automatic," "available," "based on," "because," "blended," "both," "comprising," "conditional," "configured," "depleted," "digital," "first," "implemented," "in association," "in effect," "included," "indicated," "local," "material," "more," "of," "particular," "partly," "primary," "protected," "pyrolized," "remote," "removed," "responsive," "satisfied," "second," "so as," "some," "special-purpose," "stable," "suitable," "synergistic," "temporal," "transistor-based," "undue," "updated," "upon," "utility," "via," "wherein," "without," or other such descriptors herein are used in their normal yes-or-no sense, not merely as terms of degree, unless context dictates otherwise. As used herein a computer response to a user action is not "automatic" if the response merely implements the user action. But computer responses to a user action may be "automatic" if the user-intended event ultimately triggers the computer response in a complex cascading or combinational way that few users could foresee without access to advanced technologies disclosed herein.

In light of the present disclosure, those skilled in the art will understand from context what is meant by "remote" and by other such positional descriptors used herein. Likewise they will understand what is meant by "partly based" or other such descriptions of dependent computational variables/signals. "System" as used herein refers to any set of control components intermittently or otherwise operating as parts of a communication network or other cooperatively functional hardware implementation. A system may comprise one or more facility or line "sections" or other composite material handling equipment as described herein. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon. As used herein a "local demand" refers to a quantified product need or usage somewhere within 50 kilometers not counting conduits or other mere conveyances. More generally "local" refers to a proximity of less than 50 kilometers unless context dictates otherwise. Likewise "regional" may refer to a defined geographic zone (e.g. a county, state, or district) or other such shared spatial proximity. And a responsive event is a protocol's "real time" result if a last defined trigger thereof (e.g. a user action or other programmatically detected condition) occurred less than 30 seconds before the real-time responsive result. "At" a location includes being in or on the location or less than 20 meters from the location unless context dictates otherwise.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
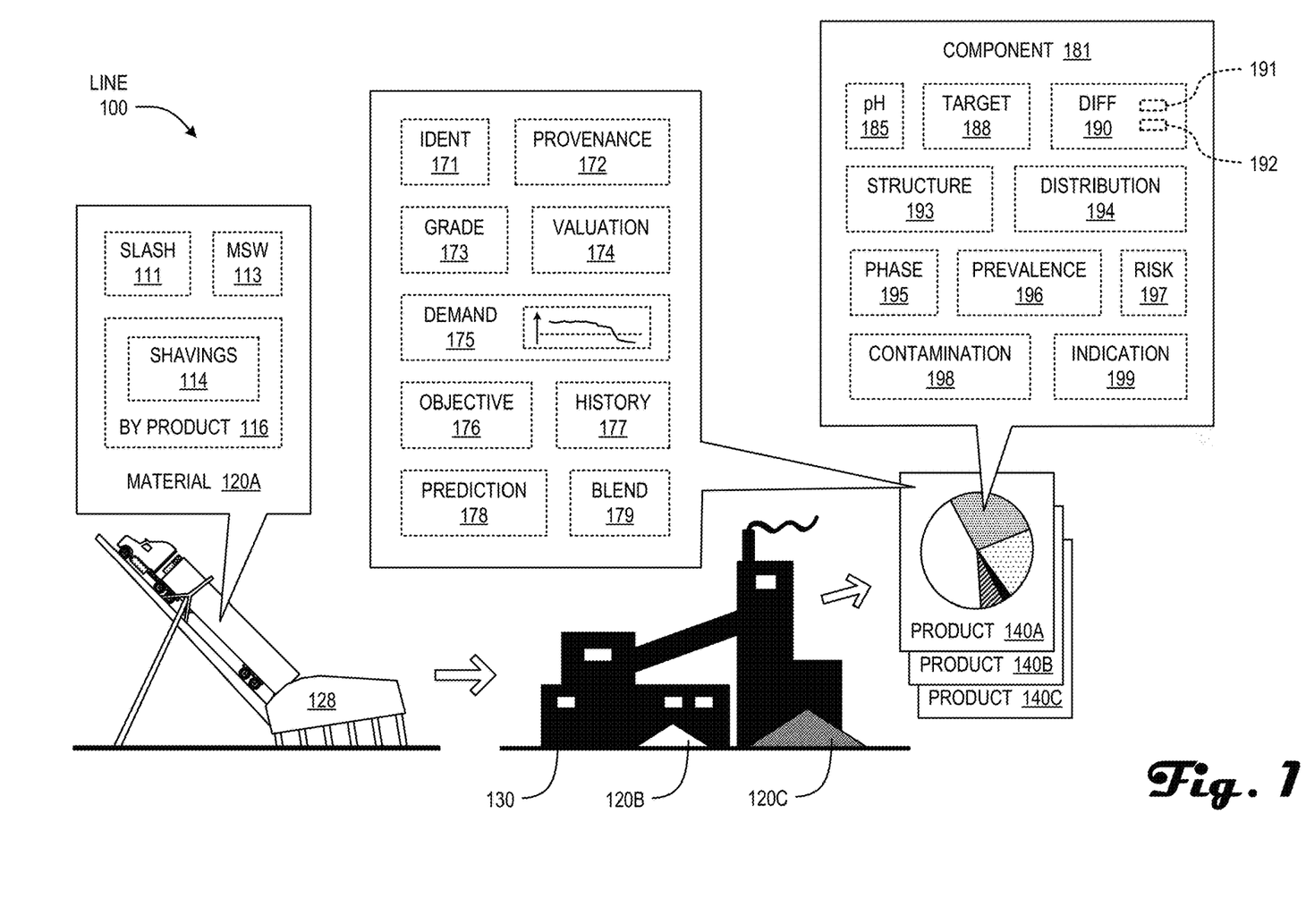
FIG. 1 schematically depicts material intake and processing in one or more improved industrial plant systems in which improved technology may be incorporated, optionally as an implementation of FIG. 1.

Referring now to FIG. 1, there is shown one or more systems comprising a production line 100 in which a (tilted truckload of) material 120A is being transferred via an intake apparatus 128 to a steam plant 130. In some contexts the material 120A may comprise slash 111, sawdust, or another clean feedstock. In others the material 120B may comprise municipal solid waste 113 or other process by products 116 that may contain contaminants partly limiting the usefulness of resulting products. Moreover some partly-processed versatile materials 120C may be sold as a product 140 of the plant 130 or processed into other products.

In such contexts each material 120 or product 140 (or lot thereof) may be specified with one or more instances of SKU's or other alphanumeric identifiers 171, of provenances 172, of grades 173, of current plant-local or plant-regional valuations 174 or demands 175, of objectives 176, of histories 177, of predictions 178, or of component blends 179 (or combinations thereof). Moreover each component 181 in a material 120 or product 140 may likewise be characterized by one or more instances of pH's 185, of targets 188, of differences 190, of structures 193 thereof, of distributions 194, of current phases 195, of prevalences 196, of risks 197, of contamination 198, or of other indications 199 pertaining to such attributes. In some contexts where an inventory target 188 is defined, for example, a difference 190 of an inventory from that target (level or range) may be characterized as a projected or other (estimated) shortage 191 or overage 192. See FIG. 7. Moreover in some variants a product 140 may be described as "green" steam (or a temperature thereof, a pressure thereof, or of another quantified indication 199 of energy therein), as a valuation 174 of carbon sequestration or permanence (e.g. expressed in "carbon credit" units or other conventional measures), or a combination of these features with tangible material components 181 (e.g. a released gas stream or solid product 140).

As used herein, a plain reference numeral (e.g. like 123) may refer generally to a member of a class of items (e.g. like materials or products) exemplified with a hybrid numeral (e.g. like 123A) and it will be understood that every item identified with a hybrid numeral is also an exemplar of the class. Moreover although a reference numeral shared between figures refers to the same item, most figures depict respective embodiments.

Figure 2:
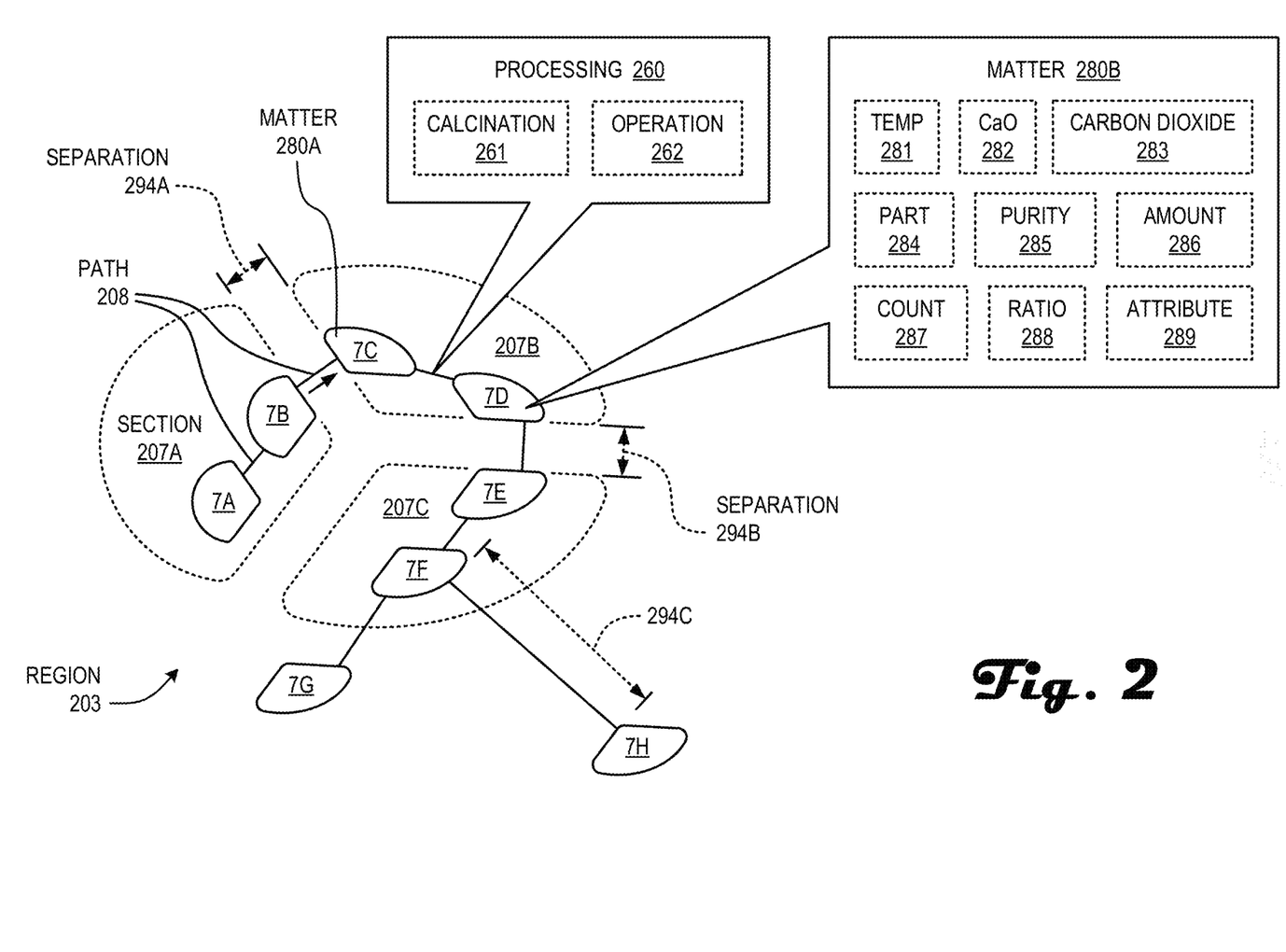
FIG. 2 schematically depicts operably coupled coordinate sections in one or more improved industrial plant systems in which improved technology may be incorporated, optionally as an implementation of FIG. 1.

Referring now to FIG. 2, there is shown a geographic region 203 in which two or more co-located or other adjoining sections 207A-C are configured in some variants. Each of these sections 207A, 207B, 207C comprises a system, as does each combination of these. A corresponding path 208 extends between successive pairs of stages 7A-F as shown, in a simplified flow of material progression. For example material at stage 7A of section 207A is (processed or otherwise) advanced along a physical path 208 (e.g. a conduit) to join or enter stage 7B as described herein. Each such path 208 may comprise one or more ducts, operations, lines, techniques, or other features pertaining to physical transference or transformation (or both). Concurrently or thereafter such material likewise moves along one or more physical paths 208 in a generally clockwise "downstream" progression. The path between stages 7A-B spans across a (nominal) local separation 294A of less than 500 meters to become (matter 280A in a holding or processing apparatus comprising) a first stage 7C of section 207B. Such material is likewise advanced to join or enter stage 7D along one or more development paths 208 that include calibrated processing 260 comprising calcination 261 or other chemical operations 262 (or both).

One or more material transfer paths 208 out of stage 7D advances modified matter 280B at a (directly or otherwise) controlled temperature 281 as described below. In a context of calcination 261, for example, one or more paths 208 of egress may carry hot pyrolysis gases (e.g. calcium oxide 282 or carbon dioxide 283) across one or more separations 294B of less than 500 meters to become (matter 280 in) a respective first stage 7E (e.g. a reformer) of another section 207C. Concurrently or thereafter such material is likewise advanced to join or enter stage 7F as shown with each product run having one or more material parts 284 optionally characterized by respective purities 285, amounts 286, counts 287, ratios 288, or other such intensive or extensive attributes 289. In a variant of calcination processing 260, for example, a resulting outflow of (a mostly solid product 140 containing highly pure) calcium oxide 282 may thereafter be labeled for use as a construction material at stage 7G. Likewise a resulting outflow of highly pure biochar 340 may thereafter be inventoried and labeled for agricultural use at stage 7G. See FIGS. 3-7. Likewise a resulting outflow of (gas containing mostly) carbon dioxide 283 may thereafter be pumped via a conduit spanning a separation 294C of 5-5000 kilometers to a remote stage 7H (e.g. via a pipeline for permanent retention in a deep saline aquafer). As used herein a "high" purity 285 pertaining to a mixture or other resulting part 284 exceeds 60% by weight unless applicable quality or product requirements dictate otherwise.

Figure 3:
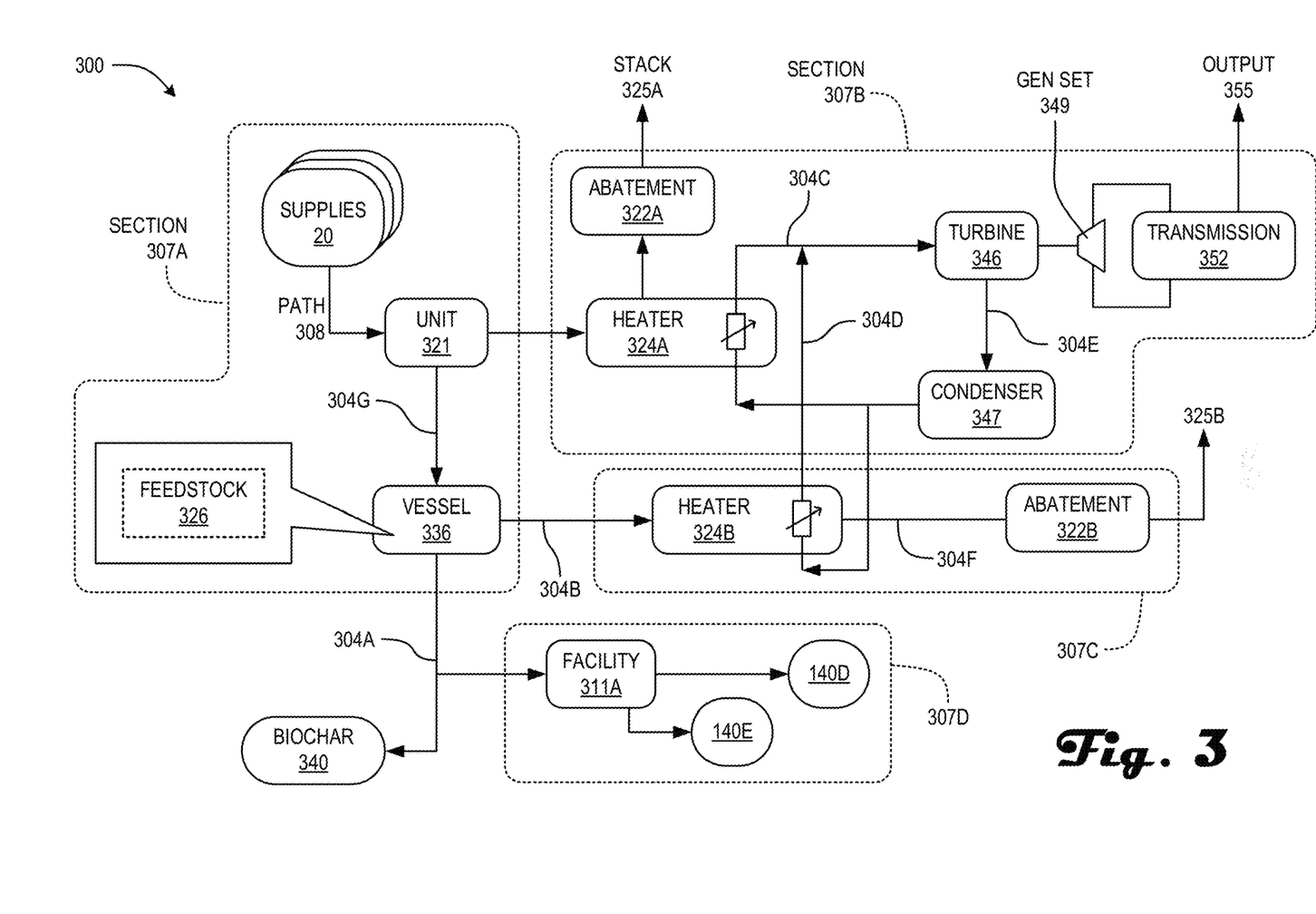
FIG. 3 schematically depicts operably coupled coordinate sections in one or more eco-friendly systems in which improved technology may be incorporated, optionally as an implementation of FIG. 1 or 2 (or both).

Referring now to FIG. 3, there is shown one or more systems 300 (each comprising one or more of the sections 307A-D as shown) configured to receive combustible materials 120 or products derived therefrom. One or more pretreatment units 321 thereof may include a feedstock dryer or gasifiers, for example, as well as augers, fans, pumps, belts, or other artificial conveyance mechanisms extending from section 307A into section 307D. After pretreatment most such materials are transferred to another section 307B that includes a primary heaters 324A (e.g. boiler or pyrolizer). Section 307A as shown may include an oxygen-depleted vessel 336 for producing an inventory primarily comprising biochar 340 (e.g. in a stockpile or transport vehicle) via a material transfer 304A. Also shown is a material transfer into a post-processing facility 311A where pyrolized material is made into a granular, capsular, fluid, or other more-refined product 140D. In some variants such a facility 311 may comprise one or more (local or other) pulverizers, sifters, pipes, pressurized repositories, or other such facility-specific material handling equipment.

Another output transfer 304B comprises a stream of pygas to a secondary heater 324B that supplements transfer 304C provided by the one or more primary heaters 324A with ("green" steam in) transfer 304D. The primary heaters 324A also provides useful ash (not shown) and a waste stream through (at least) emission abatement 322A via one or more output stacks 325A. The secondary heater 324B likewise provides a waste transfer 304F through (at least one) emission abatement 322B to an output stack 325B.

Referring again to the streams 304C-D driving one or more turbines 346 and generator set 349 as shown, electrical power output 355 is provided through one or more transmissions 352 (e.g. to an electrical grid). In addition lower-pressure steam flows (along transfer 304E) to one or more condensers 347 and then (as an aqueous condensate) to intakes of heaters 324A-B as shown.

In some contexts a plant 130 implementing the system 300 of FIG. 2 can achieve one or more synergies that are not present in conventional steam plants. Some variant configurations use a single fuel type (e.g. wood chips, shavings 114, or other such feedstock 326) that supplies both (at least one) primary energy production heater 324A and (via transfer 304G) a pyrolizer or other oxygen-depletion vessel 336 as a dual-use fuel. In some variants such dual-use fuel may provide a plant-local or plant-regional economy of scale with regard to a (wood chipper or other) size-reduction intake apparatus 128. Alternatively or additionally such dual-use fuel facilitates storage and handling as well as a fuel-drying intake apparatus 128. And as shown a dual-use condensate handling apparatus (e.g. supplying both primary and secondary heaters 324A-B as shown in FIG. 2). Alternatively or additionally a dual-use power output apparatus may comprise a single first turbine 346 and generator set 349 receiving both (streams or other) transfers 304C-D as shown.

Figure 4:
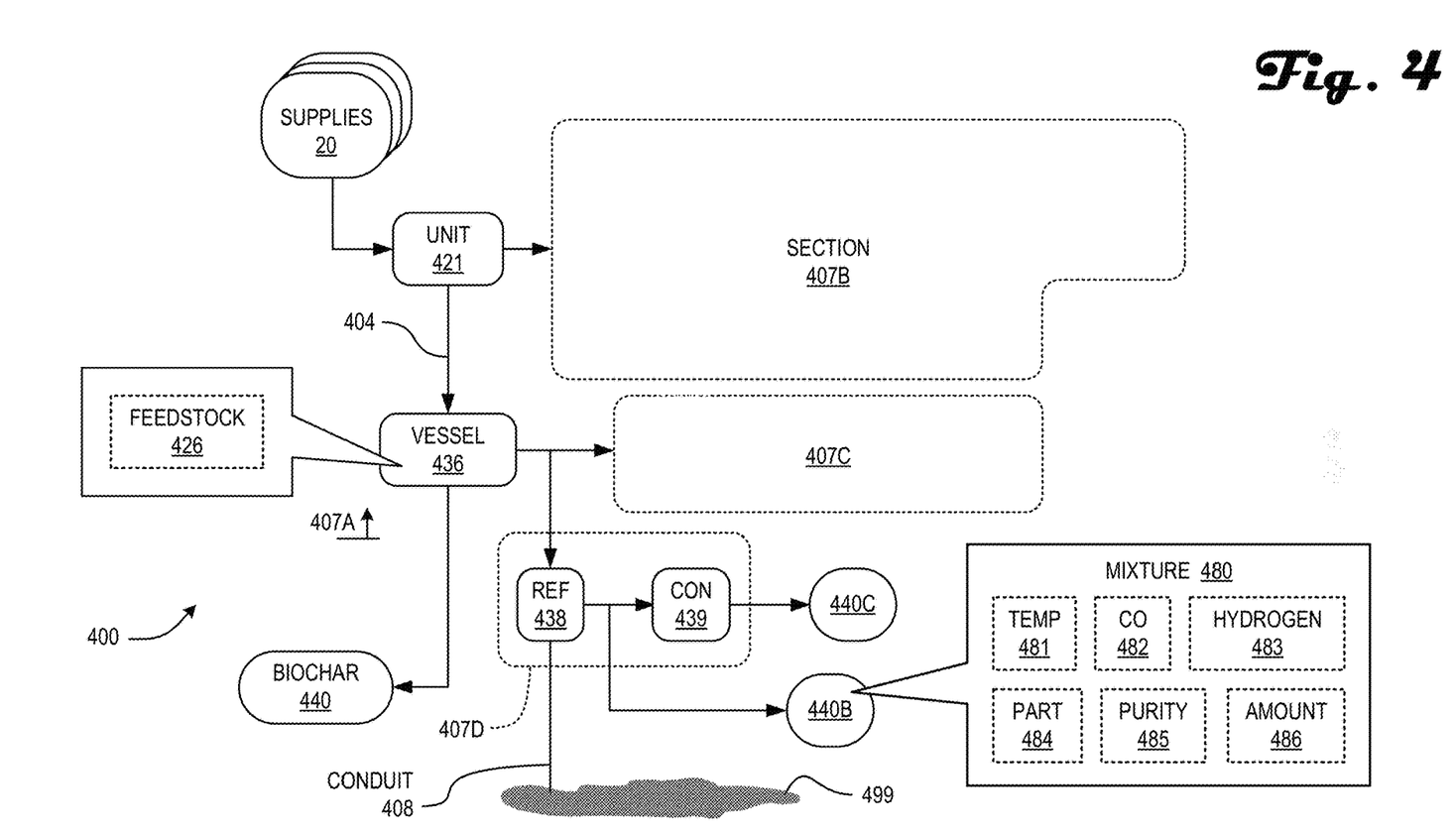
FIG. 4 schematically depicts operably coupled coordinate sections in one or more eco-friendly systems in which improved technology may be incorporated, optionally as an implementation of FIG. 1, 2, or 3.

Referring now to FIG. 4, there are likewise shown one or more systems 400 including at least a vessel 436 of section 407A configured to receive combustible materials 120 or products derived therefrom and optionally one or more additional sections 407B-D. After undergoing processing in one or more units 421 pretreated matter 280A is transferred to section 407B (optionally resembling section 307B) or into vessel(s) 436 for pyrolization and other processing 260 for making biochar 440 (or both). In some variants a coupled section 407C receives a transfer of still-hot pyrolysis gases to a kiln (as heater 324) where calcination 261 occurs at a very high temperature (i.e. above 400 degrees Celsius). In this way a carbon-mitigated generation of calcium oxide 282 and other mixture parts 284 of a suitable purity 286. In some variants a significant fraction (i.e. greater than 10% by volume) of gaseous transfer 404 out of vessel 436 is likewise directed locally to a reformer 438 where it is intermittently harvested as an extracted product 440B (e.g. as a mixture 480 of carbon monoxide 482, hydrogen 483, or other gaseous parts 484). Moreover in some variants a significant fraction of gaseous transfer 404 out of reformer 438 is likewise directed locally to a converter 439 where it is synthesized into a fuel product 440C. Alternatively or additionally some concentrated carbon dioxide 283 (i.e. greater than 70% by volume) may be pumped via one or more conduits 408 into a deep saline aquafer 499 for geological sequestration.

System 400 may be configured to conduct a primarily gaseous product 140 of a first biochar production run at a temperature 481 greater than 400 degrees Celsius (time-averaged across the volumetric amount 286, 486 of the first primarily gaseous product at an outlet thereof) upon leaving a biochar production vessel 436. A gaseous output from vessel 436 may likewise be intermittently directed to one or more reformers 438 as shown, allowing a selective harvesting of hydrogen 483 or other material parts 484 of a suitable purity 485. For example such a product 440B may comprise a mixture 480 of carbon monoxide 482 and elemental hydrogen 483 (i.e. corresponding to a volume percent >50 of the gaseous product 140) reformed from an upstream primarily gaseous product 140 while maintaining intermediate-stage parts 484 thereof (e.g. methane, carbon dioxide, or other incidental intermediary parts 484 of indirect reformation processing 260) below a fractional amount 286, 486 of 50%.

Figure 5:
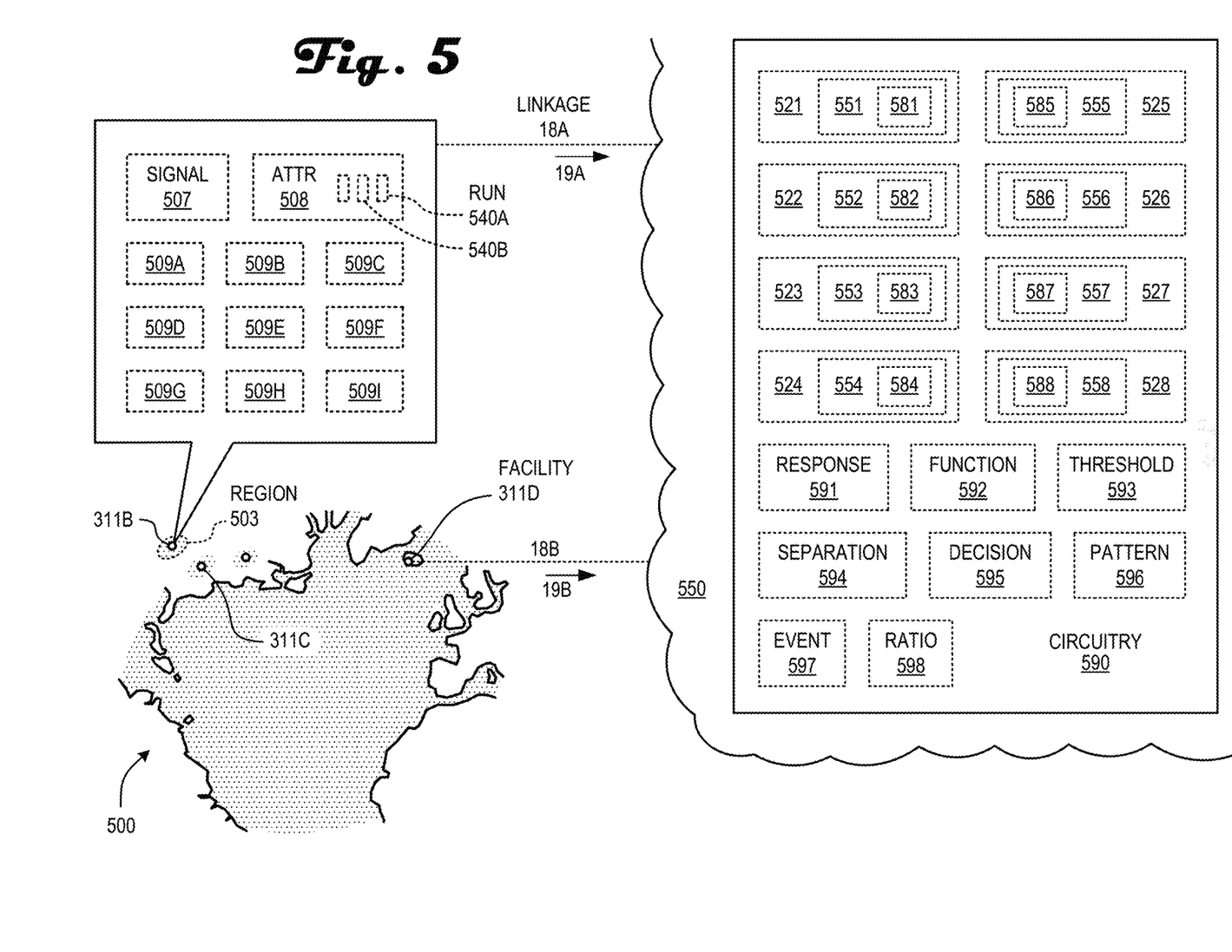
FIG. 5 schematically depicts operably coupled circuitry and other facilities in which improved technology may be incorporated, optionally including transatlantic operations affecting one or more systems of FIG. 1, 2, 3, or 4.

Referring now to FIG. 5, there is shown a system 500 according to which one or more facilities 311B-C in North America are equipped to implement carbon removal as described herein, coordinated through one or more networks 550 by a decision-providing facility 311D in Iceland. Such carbon-removal-capable facilities 311 each generally services (and is serviced by) a corresponding region 503, limiting their scale somewhat but minimizing transport-related fuel consumption. In some variants facility 311B implements a line 100 or other system 100 described above with reference to FIGS. 1-2. Various monitoring and control signals 507 are described herein for managing each such facility, seeking after material and (other) product attributes 508 for each processing run 540A-B using best-available operating protocols 509 as described herein. To communicate and coordinate such practices one or more communication linkage 18A-B to each online facility 311 may be maintained. In this way an operating facility 311B may upload digital expressions 19A manifesting events and conditions pertaining to recent industrial operations. Likewise a management facility 311D may upload digital expressions 19B manifesting protocol updates, interventions, and other determinations pertaining to such industrial processes in light of expressions 19 received from similar facilities 311C.

In various implementations special-purpose transistor-based circuitry 590—optionally implemented as an ASIC, for example—in which some or all of the functional modules described herein may be implemented. Such circuitry 590 includes one or more instances of invocation modules 521, for example, each including an electrical node set 551 upon which informational data is represented digitally as a corresponding voltage configuration 581. Such circuitry 590 likewise may include one or more instances of machine learning modules 522 each including an electrical node set 552 upon which informational data is represented digitally as a corresponding voltage configuration 582. Such circuitry 590 likewise may include one or more instances of response modules 523 each including an electrical node set 553 upon which informational data is represented digitally as a corresponding voltage configuration 583. Such circuitry 590 likewise may include one or more instances of interaction modules 524 each including an electrical node set 554 upon which informational data is represented digitally as a corresponding voltage configuration 584. Such circuitry 590 likewise may include one or more instances of recognition modules 525 each including an electrical node set 555 upon which informational data is represented digitally as a corresponding voltage configuration 585. Such circuitry 590 likewise may include one or more instances of sequencing modules 526 each including an electrical node set 556 upon which informational data is represented digitally as a corresponding voltage configuration 586. Such circuitry 590 likewise may include one or more instances of operating modules 527 each including an electrical node set 557 upon which informational data is represented digitally as a corresponding voltage configuration 587. Such circuitry 590 likewise may include one or more instances of monitoring modules 528 each including an electrical node set 558 upon which informational data is represented digitally as a corresponding voltage configuration 588. In some variants such a module implements such functionality jointly (e.g., in conjunction with one or more invocation modules 521 or processors described herein). Alternatively or additionally, in some variants such modules (or components thereof) may be distributed (e.g., so that some are implemented in special-purpose circuitry in respective facilities or servers thereof) or may handle one or more instances of responses 591, of functions 592, of thresholds 593, of separations 594, of decisions 595, of patterns 596, of events 597, or of ratios 598 as further described herein.

Referring again to FIGS. 1-3, in some variants a carbon removal/sequestration method triggers (at least a recommendation of) a physical separation 594 between first and second hybrid biochar production runs 540A-B as a selective and conditional response 591 to a recognized-risk-indicative event 597. As used herein a "hybrid" biochar product 140 is one having more than 10% and less than 90% biochar by mass. And a "hybrid" biochar production run is a completed and/or in-process hybrid biochar product 140 made or being made (or both) according to a controlled manufacturing protocol 509B without another biochar-related production interrupting the run. (A calibration, cleaning, or other temporary interruption of a run might allow the run to be resumed in some contexts.) As used herein a "carbon removal facility" refers to a purpose-built, permanent, or other buildings or equipment that actively sequester carbon dioxide or that otherwise mitigate carbon dioxide emissions. A "system" refers to Such a physical separation 594 allows the "first" hybrid biochar production run 540A to be protected from one or more evidence-based risks 197 (e.g. apparently indicative of contamination 198 or similar harm) pertaining to the second hybrid biochar production run 540B. Such a method may be triggered, for example, by invocation and machine learning module 522 operating in conjunction, the latter having been exposed to observation-, control-, or result-descriptive provenance 172 (as learning or training data) describing one or more prior hybrid biochar production runs 540. Such a separation 594 may comprise a well-timed belt stoppage, material flow diversion, premature material-loading completion (e.g. causing an outbound truck to be dispatched when less than 95% full to prevent the runs 540A-B mixing), or other such well-time responses 591 in light of teachings herein.

Such a separation 594 allows the first hybrid biochar production run 540A to be protected from a malfunction or other error that exposes one or more products 140 to a process upset (e.g. a risk 197 of contamination 198) at least pertaining to the second hybrid biochar production run 540B. This can occur, for example, in a context in which the first detected event 597 is timestamped, for example, allowing a "tail" of the at-risk second hybrid biochar production run 540B to be fully processed without concurrently processing the (subsequent) "first" hybrid biochar production run 540A through the same pretreatment unit 321. Alternatively or additionally the first detected event 597 may be (at least partly) based on a recognition module 525 detecting a machine breakdown or other significant disruption pertaining to the second hybrid biochar production run 540B.

One or more protocol violations or other evidence-based risks 197 may be detected in a context in which the first detected event 597 is timestamped, for example, allowing a "tail" of the at-risk product run 540B to be fully processed through a particular pre-treatment unit 321 without having started processing the first hybrid biochar production run 540A through that unit 321. Alternatively or additionally the first detected event 597 may be (at least partly) based on a recognition module 525 detecting a machine breakdown or other product-value-diminishing risks 197.

In some variants an eco-friendly carbon control method includes implementing first and second distinct (types of) carbon removal products 140A-B or protocols 509D-E made on a production line 100 that includes a first pyrolizer. See FIGS. 2-4. Such production may be partly based on a local or regional energy demand 175, for example, and partly based on a blend-type inventory shortage 191. This can occur, for example, in a context in which the first carbon (containment or other) mitigation protocol 509D is calibrated to yield at least 5% more (net) power output 355 than the second (containment or other) mitigation protocol 509E yields, in which the second carbon mitigation protocol 509E is calibrated to reduce the blend-type inventory shortage 191 more than twice as much as the first carbon mitigation protocol 509D does, in which the targets 188 against which such shortages 191 are measured are adjusted by machine learning or other artificial intelligence trained by operating data from prior product runs 540A-B from this plant 130 or other similar plants, in which such a line 100 would not otherwise be able to transition between useful energy output 355 and an in-demand biochar product 140 without introducing wasteful uncertainty in each product's composition, and in which such uncertainty necessitates burdensome post-processing activity including additional testing.

Many feedstocks may be processed, for example, in a context in which a (nominal or average) pyrolysis temperature is maintained hot enough to ensure that more than 10% of the first carbon removal product 140A (by mass) is ash i.e. hotter than about 450° C.; and in which the pyrolysis temperature is also maintained cool enough to ensure that more than 25% of the first carbon removal product 140A is organic carbon i.e. cooler than about 850 C. Alternatively or additionally, such a carbon removal product 140A may be distinguished from one or more other carbon removal products 140C by one or more (nominal or average) product-specific biochar concentrations thereof; by product-specific fly ash concentrations thereof; or by a ratio therebetween. In some contexts, for example, the first product 140A may be characterized as "about 2:1" and other products 140 as "about 3:1" or "about 4:1" as nominal rated values thereof. Alternatively or additionally such products may be categorized by their respective toxicity grades 173, pH's 185, or the provenance 172 of their components 181.

Referring again to coordinated carbon mitigation sections 7, 307, 407 and other processing equipment, some systems 300, 400, 500 herein are configured to heat matter 250A that is primarily calcium carbonate (i.e. more than 50% by weight) in one or more heaters 324 so that more than 1% of the calcium carbonate undergoes calcination 261 while closely coupled to a biochar production vessel 336, 436 (e.g. via a pyrolysis gas flow path 208 at most 20 to 200 meters long to the one or more heaters 324). This can occur, for example, in a context in which the one or more heaters 324 include a kiln in or near a regional facility 311 wherein multiple carbon mitigation protocols 509D-E are also implemented so that (a ratio 288 of an average amount 286, 486 of) more than 20 kilograms of calcium oxide 282 are produced in the calcination 261 for each resulting kilogram (net) of carbon dioxide equivalent released into the air above a region 203 that contains the facility 311. Such mitigation may include a systematic sequestration of highly pure carbon dioxide 283 that was embedded in the calcium carbonate, for example, or causes more than 1% of thermal waste energy from biochar processing 260 at the carbon-mitigated regional facility 311 to be used in the calcination 261. Alternatively or additionally, such carbon mitigation protocols 509D-E may be used in conjunction with one or more other protocols 509 described herein so as to increase a nominal (effective) ratio 288 of an average amount 286, 486 of calcium oxide 282 produced in the calcination 261 per unit of carbon dioxide equivalent (as a uniform measure of greenhouse gas potency) released.

As used by the United States Environmental Protection Agency and herein, a carbon dioxide "equivalent" (CO2e) means the number of metric tons of carbon dioxide emissions with the same global warming potential as one metric ton of another greenhouse gas. See Equation A-1 in 40 CFR Part 98. A calcination facility is "carbon-negative" as used herein if during a typical long-enough time interval (e.g. per week or month) a totality of calcium oxide produced in calcination 261 has a corresponding (net positive) amount 286 of (total greenhouse gas effectively quantified as) CO2e removed (from the ambient environment) at the facility. A calcination facility is "highly eco-friendly" as used herein if during a typical long-enough time interval (e.g. per week or month) a total mass M of calcium oxide produced in calcination 261 has a corresponding smaller mass less than M/50 of CO2e (not sequestered but) released at the facility.

Figure 6:
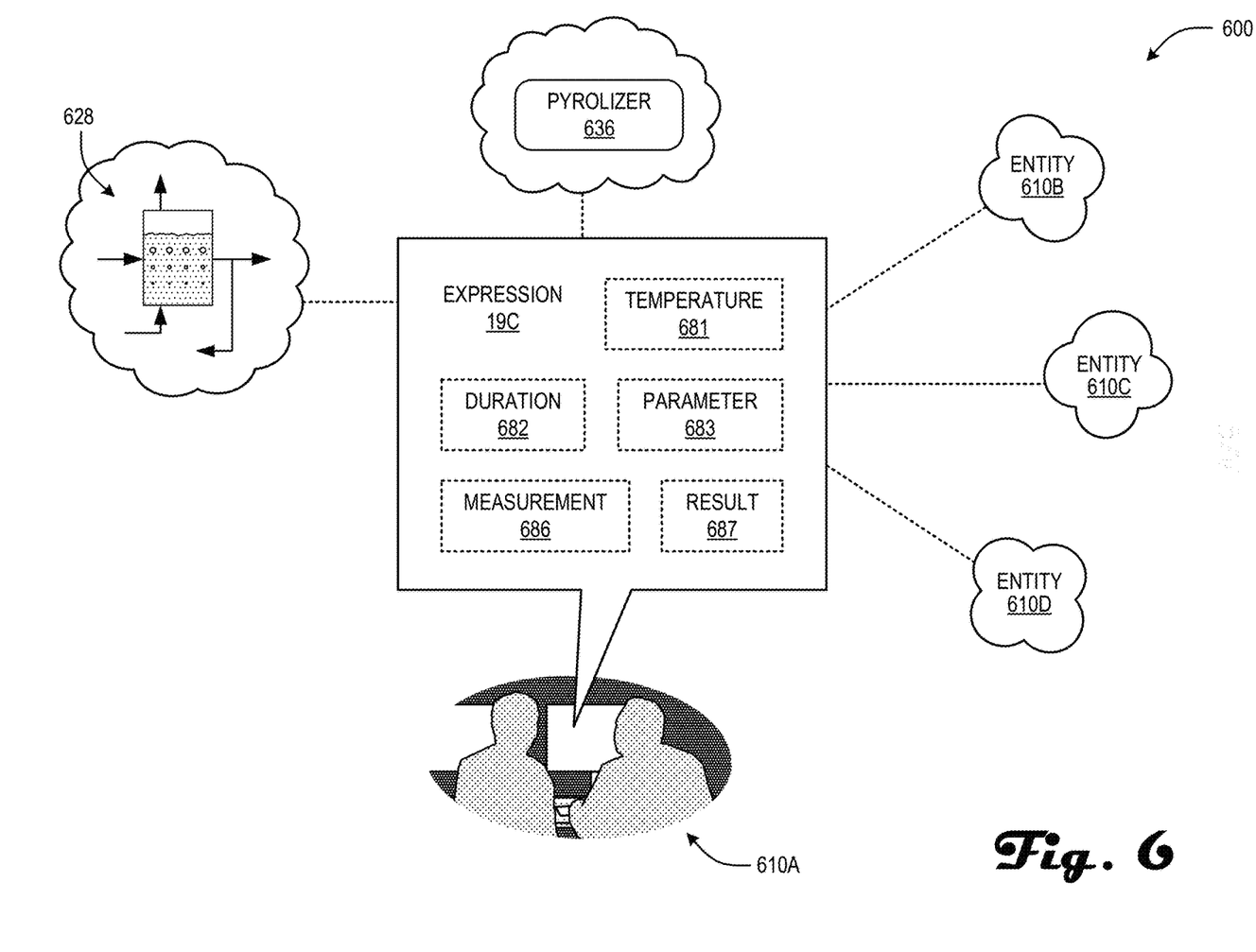
FIG. 6 schematically depicts a managing entity monitoring carbon removal and other apparatuses in which improved technology may be incorporated.

Referring now to FIG. 6, there is shown a system 600 according to which managing entity 610A (e.g., one or more interface devices in use by a human user thereof) monitors one or more pyrolizers 136, 636 or other apparatuses 128, 628 of herein-described (hybrid or other) carbon mitigation systems 300, 400, 500, 600 remotely. Through one or more control signal paths entity 610A specifies one or more flow rates, temperatures, ratios 598, or other control parameters 683 that will be used in an onsite protocol 509H upon a next material processing run 540. Likewise through one or more sensor or other monitoring signal paths entity 610A can observe in real time one or more measurements, aggregations, or other sense parameters 683 that will be used to evaluate a (success of a) result 687 of the onsite protocol 509H upon the material processing run 540. Through the systematic use of such real-time expressions 19C selectively shared among multiple entities 610B-D interested in such operations. In this way it is expected that every facility served by Myno Carbon will be able to earn the cooperation of plant-local selling entities 610B so that feedstock supply will be cost effective, of remote or other sponsoring entities 610C so that appropriate inventories of unclaimed environmental progress products 140 (e.g. carbon credits) will be managed, and plant-local or plant-regional buying or receiving entities 610C so that appropriate inventories of tolerable waste or desired useful products 140 will be managed. By whatever contractual, freely marketed, philanthropic, logistical, model-based, expert-driven, or other forecasting protocol 509F is most effective, maintaining appropriate local or regional resources and capacity in advance of demand 175 will facilitate an ongoing viability of each carbon removal facility 311 in the respective region 503 it serves.

Figure 7:
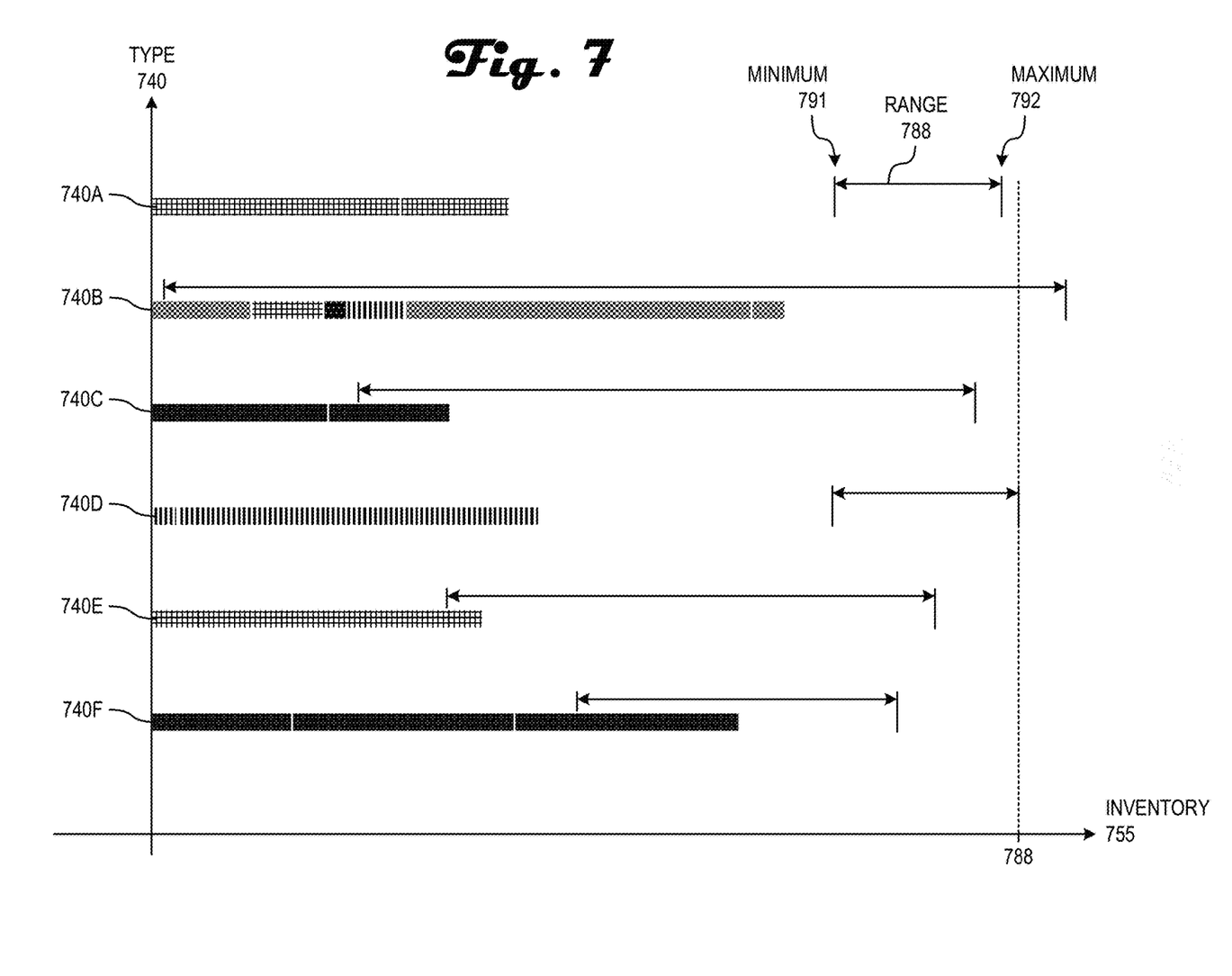
FIG. 7 schematically depicts a chart depicting multiple industrial products of distinct respective types each against its corresponding current inventory in which improved technology may be incorporated.

Referring now to FIG. 7, there is shown a chart 700 depicting multiple products 740A-F of distinct respective types each against its corresponding current inventory 755. As shown each inventory is normalized relative to its (nominal) facility-local or facility-regional capacity 788 (e.g. expressed as a percentage). A corresponding target range 789 is likewise shown for each of the products 740A-F, between respective boundaries 791-592 thereof. It will be understood that inventory or production targets 188 may likewise be points or multidimensional shapes.

In some variants a carbon control method, product line 100, or other system 300, 500 herein is configured to allow a machine-learning module 522 to cause (directly or otherwise) an automatic physical separation 594 between first and second hybrid biochar production runs 540A-B as a selective and conditional response 591 to a detected event 597 whereby the first hybrid biochar production run 540A is protected from a first (apparent or other) evidence-based risk to the second hybrid biochar production run 540B. In some variants such separation is likewise caused by operation of one or more other modules 521-328 described herein.

In some variants a carbon control method, product line 100, or other system 300, 500 herein is configured to implement (at least) first and second carbon containment protocols 509D-E via (a first production line 100 that includes) a first pyrolizer or other oxygen-depleted vessel 336 partly based on a local/regional energy demand 175 and partly based on a blend-type inventory shortage 191 wherein the first carbon mitigation protocol 509D is calibrated to yield more power output 355 than the second carbon mitigation protocol 509E yields and wherein the second carbon mitigation protocol 509E is calibrated to reduce the blend-type inventory shortage 191 more than twice as much as the first carbon mitigation protocol 509D does. Such a local/regional energy demand 175 may comprise, for example, a power or energy price, a required amount of power or energy, a binary demand value (e.g. "high" or "low" demand), or some combination of these. Alternatively or additionally, in some variants the second carbon mitigation protocol 509E may configure the blend 179 partly based on a local/regional feedstock supply or product demand prediction 178 (or both).

In some contexts such variants may feature a "first" carbon mitigation protocol 509D that yields an average (net energy) output 355 (e.g. via a stream or other (stream or other) transfer 304D) of 15 to 150 kilowatt-hours per (metric) ton of dry feedstock 326, 426. As used herein a "dry" mass of material is that portion of the mass thereof that would remain after driving off all moisture therefrom (e.g. by a prolonged exposure to dry air) or is otherwise not attributable to moisture. Also a "second" carbon mitigation protocol 509E may yield one or more products 140 corresponding to the blend-type inventory shortage 191 and having an aggregate blend 179 of more than 10% ash and more than 20% carbon by mass as well as an average output 355 of less than 15 kilowatt-hours per ton of dry feedstock 326, 426.

Moreover in regard to the "second" carbon mitigation protocol 509E, in some variants a pyrolysis temperature 681 may be set partly based on a corresponding blend-type inventory shortage 191 and partly based on a pyrolysis duration 682. Or in some variants the pyrolizer or other oxygen-depleted vessel 336 may be configured to provide a first fuel transfer 304B (e.g. more than 80% pygas) to a heater 324B pursuant to the second carbon mitigation protocol 509E and to provide a faster fuel (stream or other) transfer 304B to the heater 324B pursuant to the first carbon mitigation protocol 509D.

In some variants by which steam from one or more heaters 324A-B described herein powers (at least) a first turbine 346, at least a first condenser 347 downstream from the first turbine 347 is positioned adjacent an oxygen-depleted first vessel 336 so that at least 5% of the thermal energy recaptured during condensation is conducted through/into (a wall or chamber of) the first vessel and at least 5% of the conducted energy is thereby applied to heat feedstock 326, 426 therein. This can occur, for example, in a context in which more that 99% of such thermal energy would otherwise be emitted into an environment surrounding the first condenser 347 and ultimately become waste heat in lieu of any meaningful contribution to the production of biochar 340 and related carbon removal products 140 described herein.

In light of teachings herein, numerous existing techniques may be applied for implementing special-purpose equipment or other structures effective for conveying and preparing components, scheduling operations, calibrating and monitoring equipment, communicating data and decisions, or otherwise implementing production protocols as described herein without undue experimentation. See, e.g., U.S. patent Ser. No. 11/001,776 ("System and method of preparing pre-treated biorefinery feedstock from raw and recycled waste cellulosic biomass"); U.S. patent Ser. No. 10/065,801 ("Method and system for conveying articles and an apparatus for doing the same"); U.S. patent Ser. No. 10/005,064 ("Process for producing water-absorbing polymer particles"); U.S. Pat. No. 9,669,574 ("Twin screw rotary head extruder, method of extrusion and random extruded products"); U.S. Pat. No. 9,205,375 ("Removing carbon dioxide from waste streams through co-generation of carbonate and/or bicarbonate minerals"); U.S. Pat. No. 8,772, 559 ("Biochar generator and associated methods"); U.S. Pat. No. 8,690,975 ("Gasification system with processed feedstock/char conversion and gas reformulation"); U.S. Pat. No. 8,425,633 ("Methods for integrated fast pyrolysis processing of biomass"); U.S. Pat. No. 7,306,086 ("Sorting system using a roller-top conveyor belt"); US Pub 20210261877 ("High-carbon biogenic reagents and uses thereof"); US Pub 20180305621 ("Biochar products and production"); US Pub 20170313499 ("Delivery, storage and blending system for multi-component granular compositions"); US Pub 20170259507 ("Additive manufacturing process automation systems and methods"); and US Pub 20170066696 ("Biochar and fly ash germination accelerant system").

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

Clause 1. An eco-friendly carbon control method (in a carbon-negative or other carbon-mitigated system 300, 400, 500, 600 comprising:
heating calcium carbonate (e.g. as a major component of matter 250A, more than 50% by weight) in a first calcination heater 324B so that more than 1% of the calcium carbonate in the first calcination heater 324B thereby undergoes calcination 261 at a carbon-mitigated regional facility 311 wherein (at least) first and second carbon mitigation protocols 509D-E are also implemented so that (a ratio 288 of an average amount 286, 486 of) more than 20 kilograms of calcium oxide 282 are produced in the calcination 261 for each resulting kilogram of carbon dioxide equivalent released onsite from the carbon-mitigated regional facility 311 and wherein the first carbon mitigation protocol 509D causes more than 1% of thermal waste energy from biochar processing 260 at the carbon-mitigated regional facility 311 to be used for the heating (at least some of) the calcium carbonate in the first calcination heater 324B.

Clause 2. The eco-friendly carbon control method of Clause 1 wherein the second carbon mitigation protocol 509E causes more than 20% of previously-embedded carbon dioxide 283 liberated by the calcination from the calcium carbonate to be sequestered geologically in a deep saline aquafer linked to the carbon-mitigated regional facility 311 by one or more pipelines.

Clause 3. The eco-friendly carbon control method of Clause 1 wherein the second carbon mitigation protocol 509E causes more than 20% of carbon dioxide 283 chemically created by the calcination of the calcium carbonate to be sequestered geologically in a deep saline aquafer linked to the carbon-mitigated regional facility 311 by one or more pipelines.

Clause 4. The eco-friendly carbon control method of Clause 1 comprising:
causing first and second hybrid biochar production runs 540A-B via (at least) the first carbon mitigation protocol 509D; and
allowing a machine-learning module 522 to cause (e.g. coordination with one or more other modules 521-528 described herein) an automatic physical separation 294, 494 between first and second hybrid biochar production runs 540A-B as an automatic and conditional response 591 to a detected event 497 whereby the first hybrid biochar production run 540A is protected from a first (apparent or other) evidence-based risk 197 to the second hybrid biochar production run 540B as a third carbon mitigation protocol 509.

Clause 5. The eco-friendly carbon control method of Clause 1 wherein the carbon-mitigated regional facility 311 implements burning a uniform dual-use fuel type that supplies a first biochar-producing oxygen-depletion vessel 336, 436 and a first energy production heater 324A both at the carbon-mitigated regional facility 311.

Clause 6. The eco-friendly carbon control method of Clause 1 comprising:
processing a (nominally) uniform dual-use fuel type that supplies a first oxygen-depletion vessel 336, 436 and a first energy production heater 324A of the carbon-mitigated regional facility 311 both through a first size-reduction intake apparatus 128 in common (within or otherwise) at the carbon-mitigated regional facility 311.

Clause 7. The eco-friendly carbon control method of Clause 1 comprising:
processing a uniform dual-use fuel type that supplies both a first oxygen-depletion vessel 336, 436 and a first energy production heater 324A of the carbon-mitigated regional facility 311 through a first fuel-drying intake apparatus 128 in common (pursuant to an energy integration protocol 509I implemented) at the carbon-mitigated regional facility 311.

Clause 8. The eco-friendly carbon control method of Clause 1 wherein a primary energy production heater 324A of a particular section 307B, 407B of the carbon-mitigated regional facility 311 provides pressurized steam to (at least) a first turbine 346 and generator set 349 of the particular section 307B, 407B and wherein the first and second carbon mitigation protocols 509D-E are both implemented in the particular section 307B, 407B of the carbon-mitigated regional facility 311.

Clause 9. The eco-friendly carbon control method of Clause 1 wherein a primary energy production heater 324A of a particular section 307B, 407B of the carbon-mitigated regional facility 311 provides pressurized steam to (at least) a first turbine 346 and generator set 349 of the particular section 307B, 407B.

Clause 10. The eco-friendly carbon control method of Clause 1 wherein a primary energy production heater 324A of a particular section 307B, 407B of the carbon-mitigated regional facility 311 provides pressurized steam to (at least) a first turbine 346 and generator set 349 of the particular section 307B, 407B and wherein the second carbon mitigation protocols 509E is implemented in the particular section 307B, 407B of the carbon-mitigated regional facility 311.

Clause 11. The eco-friendly carbon control method of Clause 1 wherein more than 20 kilograms of calcium oxide 282 are produced in the calcination 261 at the carbon-mitigated regional facility 311 during a first time interval (e.g. of a month or more) and wherein the carbon-mitigated regional facility 311 is carbon-negative insofar that (enough carbon mitigation protocols 509 are followed so that) during the first time interval a totality of calcium oxide 282 produced in the calcination 261 resulted in a corresponding net positive amount 286 of carbon dioxide equivalent removed from (an entire above-ground portion of) the carbon-mitigated regional facility 311.

Clause 12. The eco-friendly carbon control method of Clause 1 wherein more than 20 kilograms of calcium oxide 282 are produced in the calcination 261 at the carbon-mitigated regional facility 311 during a first time interval (e.g. of more than 2 weeks and less than 2 years) and wherein the carbon-mitigated regional facility 311 is "highly eco-friendly" insofar that (enough carbon mitigation protocols 509 are followed so that) during the first time interval a total mass M of calcium oxide 282 produced in the calcination 261 resulted in a corresponding smaller mass less than M/50 of carbon dioxide equivalent released.

Clause 13. An eco-friendly carbon control method comprising:
conducting a hot first primarily gaseous (by-product pyrolysis gases or other) product 140 of a first biochar production run 540 at a first (nominal) temperature 481, 681 greater than 400 degrees Celsius upon leaving a first biochar-producing oxygen-depletion vessel 336, 436 of the first biochar production run 540 (time-averaged across the volumetric amount 286, 486 of the first primarily gaseous product 140 at an outlet thereof) into a first reformer 438 without first allowing the first primarily gaseous product 140 to cool below a temperature 481, 681 of 350 degrees Celsius; and (allowing or otherwise) causing the first reformer 438 to generate a second primarily gaseous product 140 "mostly comprising" a mixture 480 of carbon monoxide 482 and elemental hydrogen 483 (i.e. corresponding to a volume percent >50 of the first primarily gaseous product 140) reformed from the hot first primarily gaseous product 140 while maintaining intermediate-stage parts 484 thereof (e.g. added hydrocarbons or other incidental ingredient parts 484 between pyrolysis and reformation processing 460) below a fractional amount 286, 486 of 20% by volume.

Clause 14. The eco-friendly carbon control method of Clause 13 comprising:
causing first and second hybrid biochar production runs 540A-B via (at least) the first carbon mitigation protocol 509D; and
allowing a machine-learning module 522 to cause (e.g. coordination with one or more other modules 521-528 described herein) an automatic physical separation 294, 494 between first and second hybrid biochar production runs 540A-B as an automatic and conditional response 591 to a detected event 497 whereby the first hybrid biochar production run 540A is protected from a first (apparent or other) evidence-based risk 197 to the second hybrid biochar production run 540B.

Clause 15. The eco-friendly carbon control method of Clause 13 wherein the carbon-mitigated regional facility 311 implements one or more carbon mitigation protocols 509 that include burning a uniform dual-use fuel type that supplies both the first biochar-producing oxygen-depletion vessel 336, 436 and a primary energy production heater 324A of the carbon-mitigated regional facility 311.

Clause 16. The eco-friendly carbon control method of Clause 13 wherein the carbon-mitigated regional facility 311 implements one or more carbon mitigation protocols 509 that comprise:
processing a uniform dual-use fuel type that supplies both a first oxygen-depletion vessel 336, 436 and a primary energy production heater 324A of the carbon-mitigated regional facility 311 through a first size-reduction intake apparatus 128 in common (within or otherwise) at the carbon-mitigated regional facility 311.

Clause 17. The eco-friendly carbon control method of Clause 13 wherein the carbon-mitigated regional facility 311 implements one or more carbon mitigation protocols 509 that comprise:
processing a uniform dual-use fuel type that supplies both a first oxygen-depletion vessel 336, 436 and a primary energy production heater 324A of the carbon-mitigated regional facility 311 through a first fuel-drying intake apparatus 128 in common (pursuant to an energy integration protocol 509I implemented) at the carbon-mitigated regional facility 311.

Clause 18. The eco-friendly carbon control method of Clause 13 wherein a primary energy production heater 324A of a particular section 307B, 407B of the carbon-mitigated regional facility 311 provides pressurized steam to a first turbine 346 and generator set 349 of the particular section 307B, 407B.

Clause 19. The eco-friendly carbon control method of Clause 13 wherein more than 20 kilograms of calcium oxide 282 are produced in the calcination 261 at the carbon-mitigated regional facility 311 during a first time interval (e.g. of a month or a year) and wherein the carbon-mitigated regional facility 311 is carbon-negative.

Clause 20. The eco-friendly carbon control method of Clause 13 wherein more than 20 kilograms of calcium oxide 282 are produced in the calcination 261 at the carbon-mitigated regional facility 311 during a first time interval and wherein the carbon-mitigated regional facility 311 is "highly eco-friendly" insofar that (enough carbon mitigation protocols 509 are completed so that) during the first time interval a total mass M of calcium oxide 282 produced in the calcination 261 resulted in a corresponding smaller mass M/50 of carbon dioxide equivalent released.

Clause 21. An eco-friendly carbon control method comprising:
  allowing a machine-learning module 522 to cause (e.g. coordination with one or more other modules 521-528 described herein) an automatic physical separation 294, 494 between first and second hybrid biochar production runs 540A-B as a selective and conditional response 591 to a detected event 497 whereby the first hybrid biochar production run 540A is protected from a first (apparent or other) evidence-based risk 197 to the second hybrid biochar production run 540B.

Clause 22. The eco-friendly carbon control method of Clause 21 wherein the carbon-mitigated regional facility 311 burns a uniform dual-use fuel type that simultaneously supplies both a primary energy production heater 324A of a carbon-mitigated regional facility 311 and a first oxygen-depletion vessel 336, 436 of the first and second biochar production runs 540A-B and wherein the first and second hybrid biochar production runs 540A-B are both implemented at the carbon-mitigated regional facility 311.

Clause 23. The eco-friendly carbon control method of Clause 21 wherein a uniform dual-use fuel type that has been processed through a first size-reduction intake apparatus 128 (within or otherwise) at a carbon-mitigated regional facility 311 supplies both a first oxygen-depletion vessel 336, 436 of the first and second biochar production runs 540A-B and a primary energy production heater 324A of a carbon-mitigated regional facility 311 and wherein the first and second hybrid biochar production runs 540A-B are both implemented at the carbon-mitigated regional facility 311.

Clause 24. The eco-friendly carbon control method of Clause 21 wherein a uniform dual-use fuel type that has been processed through a first fuel-drying intake apparatus 128 (adjacent to or otherwise) at a carbon-mitigated regional facility 311 supplies both a first oxygen-depletion vessel 336, 436 of the first and second biochar production runs 540A-B and a primary energy production heater 324A of a carbon-mitigated regional facility 311 and wherein the first and second hybrid biochar production runs 540A-B are both implemented at the carbon-mitigated regional facility 311.

Clause 25. The eco-friendly carbon control method of Clause 21 wherein a primary energy production heater 324A of a first section 307B, 407B of a carbon-mitigated regional facility 311 provides pressurized steam to a first turbine 346 and generator set 349 of the first section 307B, 407B and wherein the first and second hybrid biochar production runs 540A-B are both implemented at the carbon-mitigated regional facility 311.

Clause 26. The eco-friendly carbon control method of Clause 21 wherein a primary energy production heater 324A of a particular section 307B, 407B of the carbon-mitigated regional facility 311 provides pressurized steam to a first turbine 346 and generator set 349 of the particular section 307B, 407B and wherein the first and second hybrid biochar production runs 540A-B are both implemented at the carbon-mitigated regional facility 311.

Clause 27. An eco-friendly carbon control method comprising:
  implementing first and second carbon containment protocols 509D-E on a first production line 100 that includes a first pyrolizer 236 partly based on a local energy demand 175 and partly based on a blend-type inventory shortage 191 (e.g. an inventory 755 below a corresponding product minimum 791 or other current target 188) wherein the first carbon mitigation protocol 509D is calibrated to yield more power output 255 than the second carbon mitigation protocol 509E yields and wherein the second carbon mitigation protocol 509E is calibrated to reduce the blend-type inventory shortage 191 more than twice as much (e.g. over an interval of 1 to 10 days or weeks) as the first carbon mitigation protocol 509D.

Clause 28. The eco-friendly carbon control method of Clause 27 wherein the first and second carbon mitigation protocols 509D-E are both implemented at a carbon-mitigated regional facility 311 (e.g. a single line 100, plant 130, or cooperative sections 207, 307, 407 in a single region 503), the method comprising:
  causing first and second hybrid biochar production runs 540A-B via (at least) the first carbon mitigation protocol 509D; and
  allowing a machine-learning module 522 to cause (e.g. coordination with one or more other modules 521-528 described herein) an automatic physical separation 294, 494 between first and second hybrid biochar production runs 540A-B as an automatic and conditional response 591 to a detected event 497 whereby the first hybrid biochar production run 540A is protected from a first (apparent or other) evidence-based risk 197 to the second hybrid biochar production run 540B.

Clause 29. The eco-friendly carbon control method of Clause 27 wherein a carbon-mitigated regional facility 311 implements the first and second carbon mitigation protocols 509D-E that include burning a (nominally) uniform dual-use fuel type that supplies both a first oxygen-depletion vessel 336, 436 and a primary energy production heater 324A of the carbon-mitigated regional facility 311 and wherein the first and second carbon mitigation protocols 509D-E are both implemented at the carbon-mitigated regional facility 311.

Clause 30. The eco-friendly carbon control method of Clause 27 wherein the first and second carbon mitigation protocols 509D-E are both implemented at a carbon-mitigated regional facility 311 (e.g. a single line 100, plant 130, or cooperative sections 207, 307, 407 in a single region 503) and wherein the eco-friendly carbon control method comprises:
  processing a uniform dual-use fuel type that supplies both a first oxygen-depletion vessel 336, 436 and a primary energy production heater 324A of the carbon-mitigated regional facility 311 through a first size-reduction intake apparatus 128 (within or otherwise) at the carbon-mitigated regional facility 311.

Clause 31. The eco-friendly carbon control method of Clause 27 wherein the first and second carbon mitigation protocols 509D-E are both implemented at a carbon-mitigated regional facility 311 and wherein the eco-friendly carbon control method comprises:
  processing a uniform dual-use fuel type that supplies both a first oxygen-depletion vessel 336, 436 and a primary energy production heater 324A of the carbon-mitigated regional facility 311 through a first fuel-drying intake apparatus 128 (adjacent to or otherwise) at the carbon-mitigated regional facility 311.

Clause 32. The eco-friendly carbon control method of Clause 27 wherein a primary energy production heater 324A of a particular section 307B, 407B of the carbon-mitigated regional facility 311 provides pressurized steam to a first turbine 346 and generator set 349 of the particular section 307B, 407B and wherein the first and second carbon mitigation protocols 509D-E are both implemented at the carbon-mitigated regional facility 311.

Clause 33. An eco-friendly carbon control method comprising:
- causing a first material stream (e.g. as transfer 304C) primarily composed of steam received from one or more boilers (e.g. an instance of heater 324A) to power a first turbine 346 at a carbon-mitigated regional facility 311 and to undergo partial cooling (e.g. from above 800 C to below 700 C) adjacent a first oxygen-depleted vessel 336. 436 (e.g. a pyrolizer or gasifier) as a component of a steam condensation protocol 509C at the carbon-mitigated regional facility 311 so as to cause more than 5 kilowatts of energy output emitted during the steam condensation protocol 509C to be applied to producing biochar 540 via the first oxygen-depleted vessel 336. 436 as a real-time response to the steam being received at the first turbine 346.

Clause 34. The eco-friendly carbon control method of Clause 33 comprising:
- implementing first and second carbon containment protocols 509D-E on a first production line 100 at the carbon-mitigated regional facility 311 that includes a first pyrolizer 236 partly based on a local energy demand 175 and partly based on a blend-type inventory shortage 191 (e.g. an inventory 755 below a corresponding product minimum 791 or other current target 188) wherein the first carbon mitigation protocol 509D is calibrated to yield more power output 255 than the second carbon mitigation protocol 509E yields and wherein the second carbon mitigation protocol 509E is calibrated to reduce the blend-type inventory shortage 191 more than twice as much (e.g. over an interval of 1 to 10 days or weeks) as the first carbon mitigation protocol 509D.

Clause 35. The eco-friendly carbon control method of Clause 33 wherein the first and second carbon mitigation protocols 509D-E are both implemented at the carbon-mitigated regional facility 311 (e.g. a single line 100, plant 130, or cooperative sections 207, 307, 407 in a single region 503), the method comprising:
- causing first and second hybrid biochar production runs 540A-B via (at least) the first carbon mitigation protocol 509D; and
- allowing a machine-learning module 522 to cause (e.g. coordination with one or more other modules 521-528 described herein) an automatic physical separation 294, 494 between first and second hybrid biochar production runs 540A-B as an automatic and conditional response 591 to a detected event 497 whereby the first hybrid biochar production run 540A is protected from a first (apparent or other) evidence-based risk 197 to the second hybrid biochar production run 540B.

Clause 36. The eco-friendly carbon control method of Clause 33 wherein the carbon-mitigated regional facility 311 implements the first and second carbon mitigation protocols 509D-E that include burning a uniform dual-use fuel type that supplies both a first oxygen-depletion vessel 336, 436 and a primary energy production heater 324A of the carbon-mitigated regional facility 311 and wherein the first and second carbon mitigation protocols 509D-E are both implemented at the carbon-mitigated regional facility 311 (e.g. a single line 100, plant 130, or cooperative sections 207, 307, 407 in a single region 503).

Clause 37. The eco-friendly carbon control method of Clause 33 wherein the first and second carbon mitigation protocols 509D-E are both implemented at the carbon-mitigated regional facility 311 (e.g. a single line 100, plant 130, or cooperative sections 207, 307, 407 in a single region 503) and wherein the eco-friendly carbon control method comprises:
- processing a uniform dual-use fuel type that supplies both a first oxygen-depletion vessel 336, 436 and a primary energy production heater 324A of the carbon-mitigated regional facility 311 through a first size-reduction intake apparatus 128 (within or otherwise) at the carbon-mitigated regional facility 311.

Clause 38. The eco-friendly carbon control method of Clause 33 wherein the first and second carbon mitigation protocols 509D-E are both implemented at the carbon-mitigated regional facility 311 and wherein the eco-friendly carbon control method comprises:
- processing a uniform dual-use fuel type that supplies both a first oxygen-depletion vessel 336, 436 and a primary energy production heater 324A of the carbon-mitigated regional facility 311 through a first fuel-drying intake apparatus 128 (pursuant to an energy integration protocol 509I implemented) at the carbon-mitigated regional facility 311.

Clause 39. The eco-friendly carbon control method of Clause 33 wherein a primary energy production heater 324A of a particular section 307B, 407B of the carbon-mitigated regional facility 311 provides pressurized steam to a first turbine 346 and generator set 349 of the particular section 307B, 407B and wherein the first and second carbon mitigation protocols 509D-E are both implemented at the carbon-mitigated regional facility 311.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Terms like "responsive to," "related to," or other such transitive, relational, or other connections do not generally exclude such variants, unless context dictates otherwise. Furthermore each claim below is intended to be given its least-restrictive interpretation that is reasonable to one skilled in the art.

What is claimed is:

1. An eco-friendly carbon control method comprising:
heating calcium carbonate in a first calcination heater so that more than 1% of said calcium carbonate in said first calcination heater thereby undergoes calcination at a carbon-mitigated regional facility wherein first and second carbon mitigation protocols are also implemented so that more than 20 kilograms of calcium oxide are produced in said calcination for each resulting kilogram of carbon dioxide equivalent released from said carbon-mitigated regional facility and wherein said first carbon mitigation protocol causes more than 1% of thermal waste energy from biochar processing at said carbon-mitigated regional facility to be used for said heating said calcium carbonate in said first calcination heater.

2. The eco-friendly carbon control method of claim 1 wherein more than 20 kilograms of calcium oxide are produced in said calcination at said carbon-mitigated regional facility during a first time interval and wherein said carbon-mitigated regional facility is highly eco-friendly insofar that during said first time interval a total mass M of calcium oxide produced in said calcination resulted in a corresponding smaller mass less than M/50 of carbon dioxide equivalent released.

3. The eco-friendly carbon control method of claim 2 wherein said second carbon mitigation protocol causes more than 20% of carbon dioxide chemically created by said calcination of said calcium carbonate to be sequestered geologically in a deep saline aquafer linked to said carbon-mitigated regional facility by one or more pipelines.

4. The eco-friendly carbon control method of claim 2 comprising:
causing first and second hybrid biochar production runs via said first carbon mitigation protocol; and
allowing a machine-learning module to cause an automatic physical separation between first and second hybrid biochar production runs as an automatic and conditional response to a detected event whereby said first hybrid biochar production run is protected from a first evidence-based risk to said second hybrid biochar production run as a third carbon mitigation protocol.

5. The eco-friendly carbon control method of claim 2 wherein said carbon-mitigated regional facility implements burning a uniform dual-use fuel type that supplies a first biochar-producing oxygen-depletion vessel and a first energy production heater both at said carbon-mitigated regional facility.

6. The eco-friendly carbon control method of claim 2 comprising:
processing a uniform dual-use fuel type that supplies a first oxygen-depletion vessel and a first energy production heater of said carbon-mitigated regional facility both through a first size-reduction intake apparatus in common at said carbon-mitigated regional facility.

7. The eco-friendly carbon control method of claim 2 comprising:
processing a uniform dual-use fuel type that supplies both a first oxygen-depletion vessel and a first energy production heater of said carbon-mitigated regional facility through a first fuel-drying intake apparatus in common at said carbon-mitigated regional facility.

8. The eco-friendly carbon control method of claim 2 wherein a primary energy production heater of a particular section of said carbon-mitigated regional facility provides pressurized steam to a first turbine and generator set of said particular section and wherein said first and second carbon mitigation protocols are both implemented in said particular section of said carbon-mitigated regional facility.

9. The eco-friendly carbon control method of claim 2 wherein a primary energy production heater of a particular section of said carbon-mitigated regional facility provides pressurized steam to a first turbine and generator set of said particular section.

10. The eco-friendly carbon control method of claim 2 wherein a primary energy production heater of a particular section of said carbon-mitigated regional facility provides pressurized steam to a first turbine and generator set of said particular section and wherein said second carbon mitigation protocols is implemented in said particular section of said carbon-mitigated regional facility.

11. The eco-friendly carbon control method of claim 2 wherein said carbon-mitigated regional facility is carbon-negative insofar that during said first time interval a totality of calcium oxide produced in said calcination resulted in a corresponding net positive amount of carbon dioxide equivalent removed from said carbon-mitigated regional facility.

12. The eco-friendly carbon control method of claim 2 wherein said second carbon mitigation protocol causes more than 20% of previously-embedded carbon dioxide liberated by said calcination from said calcium carbonate to be sequestered geologically in a deep saline aquafer linked to said carbon-mitigated regional facility by one or more pipelines.

13. The eco-friendly carbon control method of claim 1 comprising:
conducting a hot first primarily gaseous product of a first biochar production run of said biochar processing at said carbon-mitigated regional facility at a first temperature greater than 400 degrees Celsius upon leaving a first biochar-producing oxygen-depletion vessel of said first biochar production run into a first reformer without first allowing said first primarily gaseous product to cool below a temperature of 350 degrees Celsius; and
causing said first reformer to generate a second primarily gaseous product "mostly comprising" a mixture of carbon monoxide and elemental hydrogen reformed from said hot first primarily gaseous product while maintaining intermediate-stage parts thereof below a fractional amount of 20% by volume.

14. The eco-friendly carbon control method of claim 1 comprising:
implementing said first and second carbon mitigation protocols on a first production line that includes a first pyrolizer partly based on a local energy demand and partly based on a blend-type inventory shortage wherein said first carbon mitigation protocol is calibrated to yield more power output than said second carbon mitigation protocol yields and wherein said second carbon mitigation protocol is calibrated to reduce said blend-type inventory shortage more than twice as much as said first carbon mitigation protocol.

15. The eco-friendly carbon control method of claim 1 comprising:
causing a first material stream primarily composed of steam received from one or more boilers to power a first turbine at said carbon-mitigated regional facility and to undergo partial cooling adjacent a first oxygen-depleted vessel as a component of a steam condensation protocol at said carbon-mitigated regional facility so as to cause more than 5 kilowatts of energy output emitted during said steam condensation protocol to be applied to producing biochar in said biochar processing via said first oxygen-depleted vessel as a real-time response to said steam being received at said first turbine.

16. The eco-friendly carbon control method of claim 1 wherein (1) said second carbon mitigation protocol causes more than 20% of previously-embedded carbon dioxide liberated by said calcination from said calcium carbonate to be sequestered geologically in a deep saline aquafer linked to said carbon-mitigated regional facility by one or more pipelines or wherein (2) said second carbon mitigation protocol causes more than 20% of carbon dioxide chemically created by said calcination of said calcium carbonate to be sequestered geologically in a deep saline aquafer linked to said carbon-mitigated regional facility by one or more pipelines.

17. The eco-friendly carbon control method of claim 1 wherein (1) more than 20 kilograms of calcium oxide are produced in said calcination at said carbon-mitigated regional facility during a first time interval and wherein said carbon-mitigated regional facility is carbon-negative insofar that during said first time interval a totality of calcium oxide produced in said calcination resulted in a corresponding net positive amount of carbon dioxide equivalent removed from said carbon-mitigated regional facility or wherein (2) more than 20 kilograms of calcium oxide are produced in said calcination at said carbon-mitigated regional facility during a first time interval and wherein said carbon-mitigated regional facility is highly eco-friendly insofar that during said first time interval a total mass M of calcium oxide produced in said calcination resulted in a corresponding smaller mass less than M/50 of carbon dioxide equivalent released.

18. The eco-friendly carbon control method of claim 1 wherein (1) said second carbon mitigation protocol causes more than 20% of previously-embedded carbon dioxide liberated by said calcination from said calcium carbonate to be sequestered geologically in a deep saline aquafer linked to said carbon-mitigated regional facility by one or more pipelines or wherein (2) said second carbon mitigation protocol causes more than 20% of carbon dioxide chemically created by said calcination of said calcium carbonate to be sequestered geologically in a deep saline aquafer linked to said carbon-mitigated regional facility by one or more pipelines or wherein (3) more than 20 kilograms of calcium oxide are produced in said calcination at said carbon-mitigated regional facility during a first time interval and wherein said carbon-mitigated regional facility is carbon-negative insofar that during said first time interval a totality of calcium oxide produced in said calcination resulted in a corresponding net positive amount of carbon dioxide equivalent removed from said carbon-mitigated regional facility or wherein (4) more than 20 kilograms of calcium oxide are produced in said calcination at said carbon-mitigated regional facility during a first time interval and wherein said carbon-mitigated regional facility is highly eco-friendly insofar that during said first time interval a total mass M of calcium oxide produced in said calcination resulted in a corresponding smaller mass less than M/50 of carbon dioxide equivalent released.

19. The eco-friendly carbon control method of claim 18 wherein said more than 20 kilograms of calcium oxide are produced in said calcination at said carbon-mitigated regional facility during said first time interval and wherein said carbon-mitigated regional facility is carbon-negative insofar that during said first time interval said totality of calcium oxide produced in said calcination resulted in said corresponding net positive amount of carbon dioxide equivalent removed from said carbon-mitigated regional facility.

20. An eco-friendly carbon control system comprising:
a carbon-mitigated regional facility in which calcium carbonate is heated in a first calcination heater so that more than 1% of said calcium carbonate in said first calcination heater thereby undergoes calcination wherein first and second carbon mitigation protocols are also implemented so that more than 20 kilograms of calcium oxide are produced in said calcination for each resulting kilogram of carbon dioxide equivalent released from said carbon-mitigated regional facility and wherein said first carbon mitigation protocol causes more than 1% of thermal waste energy from biochar processing at said carbon-mitigated regional facility to be used for said heating said calcium carbonate in said first calcination heater.

* * * * *